United States Patent
Roberts (10) Patent No.: US 6,871,823 B2
(45) Date of Patent: Mar. 29, 2005

(54) CARGO LOADING SYSTEM

(75) Inventor: Aaron James Roberts, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/612,815

(22) Filed: Jul. 2, 2003

(65) Prior Publication Data

US 2004/0037684 A1 Feb. 26, 2004

(30) Foreign Application Priority Data

Jul. 5, 2002 (GB) .............................................. 0215580

(51) Int. Cl.[7] .............................................. B64D 9/00
(52) U.S. Cl. .............................. 244/137.1; 198/370.09; 414/373
(58) Field of Search .......................... 244/137.1, 137.5, 244/118.1; 198/782, 787, 457.07, 370.09, 786; 414/373, 398, 502, 809, 529

(56) References Cited

U.S. PATENT DOCUMENTS

| | | | |
|---|---|---|---|
| 4,050,655 A | | 9/1977 | Bogue et al. |
| 4,301,984 A | * | 11/1981 | Olason, Ray ............ 244/137.1 |
| 4,589,542 A | * | 5/1986 | Steadman ................... 198/782 |
| 4,787,808 A | | 11/1988 | Shimoji et al. |
| 5,101,960 A | * | 4/1992 | Simons ................. 198/457.07 |
| 5,101,962 A | * | 4/1992 | Pritchard .................... 198/782 |
| 6,622,846 B1 | * | 9/2003 | Dean ..................... 198/370.09 |
| 6,705,817 B2 | * | 3/2004 | Wittenstein et al. ........ 414/373 |

FOREIGN PATENT DOCUMENTS

EP 1203716 8/2002

* cited by examiner

Primary Examiner—Galen Barefoot
(74) Attorney, Agent, or Firm—Andrus, Sceales, Starke & Sawall, LLP (57) ABSTRACT

A method of loading a ULD into a cargo compartment of an aircraft through a loading door opening of the cargo compartment, which method requires turning of the ULD and comprises the steps of:

loading the ULD into the compartment to a first position, rotating the ULD about a first pivot axis to a second position wherein the second position includes a portion of the ULD protruding outside the compartment through the loading door opening, and rotating the ULD about a second pivot axis to a third position wholly within the compartment. The invention further resides in a method of unloading, an apparatus for loading and unloading, and a control system for controlling loading.

19 Claims, 6 Drawing Sheets

CARGO LOADING SYSTEM

TECHNICAL FIELD

The present invention relates to a system for loading and unloading cargo from an aircraft.

BACKGROUND ART

Cargo transported by aircraft is generally loaded onto pallets or into containers having set dimensions, and termed unit load devices (ULDs). There are two standard sizes of ULDs, both of which have 125-inch (3175 mm) lengths. The 88-inch units have a width of 2235 mm and the 96-inch units have a width of 2438 mm. ULDs are loaded through a cargo door in the side of the aircraft onto a floor of a cargo compartment.

The floor of the cargo compartment is provided with devices for facilitating movement of the ULD during loading and unloading operations. A plethora of freely rotating conveyance roller-balls protrude through the floor to provide low friction support for the ULDs. Power drive units (PDUs) are energiseable to be elevated from beneath the floor to a level just above the conveyance rollers. Each PDU is a separate electro-mechanical actuator which includes one or more rubber coated wheels or drive rollers for contacting the underside of the ULD and providing a drive to move the ULD in a set direction.

In a known cargo compartment, the compartment is just wide enough for the ULDs to fit length-wise across the compartment. Lateral PDUs are provided to drive the ULD through the door in the aircraft side until it is situated entirely within the compartment. Longitudinal PDUs are then energised to drive the ULD along the compartment to its final position. The cargo is loaded through a 98-inch door, which has an opening about 50 mm larger than the width of the wider, 96-inch ULDs.

By narrowing the width of the cargo compartment at a point between the cargo door and the farther end of the compartment, better use can be made of the space in an aircraft. To make use of this space, however, it is necessary to turn the ULDs before they are driven into position in the narrower portion of the compartment. This presents a difficulty as the close fit between the width of the ULD and the cargo door opening restricts the room available for turning. Also, the orientation of the PDUs is such as to drive the ULD in either a lateral or longitudinal direction, but not to facilitate turning.

U.S. Pat. No. 5,101,960 describes a cargo loading system for an aircraft, in which the ULDs are turned about a pivot device as the ULD is loaded into the cargo compartment. The pivot device has a normal position below the conveyance plane, in which it is out of contact with the ULD, and is moved towards frictional engagement with the ULD so as to form a pivot axis when the ULD is to be turned. Rotating conveyance rollerballs drive the ULD, which is pinned at the pivot axis, such that the ULD is pivoted. When the desired rotation is achieved the pivot device is lowered so that the ULD may be fully conveyed into the compartment. One problem with this system is that the rubber coated wheels or drive rollers, which contact the underside of the ULD, are prone to scrubbing and side loading which adversely affect tyre life. Additionally, the system is not compatible with all types of aircraft compartment as a large overhang space is required for the ULD during turning.

It is an object of the present invention to remove or alleviate at least one of the aforementioned problems.

DISCLOSURE OF INVENTION

According to a first aspect of the present invention there is provided a method of loading a ULD into a cargo compartment of an aircraft through a loading door opening of the cargo compartment, which method requires turning of the ULD and comprises the steps of:

I. loading the ULD into the compartment to a first position,

II. rotating the ULD about a first pivot axis to a second position wherein the second position includes a portion of the ULD protruding outside the compartment through the loading door opening, and III. rotating the ULD about a second pivot axis to a third position wholly within the compartment.

The first and second pivot axes may be at predetermined locations in the cargo compartment defined by respective first and second pivot means, the first and second pivot means each being operative for supporting the ULD at the respective pivot axis.

In a preferred embodiment, the compartment is provided with a set of PDUs comprising a plurality of lateral PDUs energiseable for driving the ULD through the loading door in a lateral direction across the cargo compartment, a plurality of longitudinal PDUs energiseable for driving the ULD in a longitudinal direction along the cargo compartment and at least one off-set PDU energiseable for providing a drive to the ULD at an angle between the lateral and longitudinal directions; wherein the step of loading comprises energising at least one of the lateral PDUs to drive the ULD into the loading bay to the first position.

Preferably, the first pivot means is energiseable to support the ULD at the first pivot axis, the first pivot means having at least two associated PDUs of the set of PDUs aligned therewith, the step of rotating the ULD to the second position comprising energising the first pivot means and PDUs associated therewith.

Preferably, the second pivot means is energiseable to support the ULD at the second pivot axis, the second pivot means having at least two associated PDUs of the set of PDUs aligned therewith, the step of rotating the ULD to the third position comprising energising of the second pivot and PDUs associated therewith.

In a preferred embodiment the step of loading the ULD into the compartment comprises:

a) inserting an end of the ULD through the loading door opening, b) energising at least one of the lateral PDUs to drive the ULD into the compartment to the first position defined by a signal from a first proximity sensor for sensing proximity of the ULD.

Conveniently, the first proximity sensor is situated adjacent a wall of the compartment opposite the loading door.

Preferably, the steps of rotating the ULD comprise the following procedure:

a) energising the first pivot means and PDUs associated therewith to rotate the ULD to the second position defined by a signal from a second proximity sensor, and b) energising the second pivot means and PDUs associated therewith to rotate the ULD to the third position defined by a signal from a third proximity sensor.

Conveniently, the second proximity sensor is situated adjacent an edge of the loading door opening.

Conveniently, the third proximity sensor is situated adjacent a wall of the compartment alongside the loading door opening.

In a preferred embodiment the method includes an additional final step of energising at least one of the longitudinal PDUs to drive the ULD into a final position in the cargo compartment.

The method may include, prior to the final step, the additional steps of:
a) energising the longitudinal PDUs to drive the ULD towards a fourth position defined by a signal from a fourth proximity sensor, the fourth position being situated adjacent the loading door so that the ULD is driveable by the lateral PDUs, and
b) energising the lateral PDUs to drive the ULD to a fifth position.

In a preferred embodiment the fifth position is aligned with a reduced width portion of the cargo compartment so that the final position of the ULD is situated within the reduced width portion of the cargo compartment.

In a preferred embodiment, the cargo compartment is further provided with a retractable guide rail for guiding movement of the ULD, the guide rail being disposed laterally across the compartment and having an alignment with an edge of the loading door opening, wherein prior to the steps of rotating the ULD the guide rail is retracted, thereby enabling a portion of the ULD to extend past the guide rail alignment during the rotating steps.

In an alternative embodiment, step II comprises energising a first set of PDUs for a first predetermined time, step III comprises energising a second set of PDUs for a second predetermined time, and a further step comprises energising a set of lateral PDUs to drive the ULD against a set of guide rails.

According to a second aspect of the present invention there is provided a method of unloading a ULD from a cargo compartment of an aircraft through a loading door opening of the cargo compartment, which method requires turning of the ULD and comprises the steps of:
I. positioning the ULD in a first predetermined position in the cargo compartment,
II. rotating the ULD to a second position wherein the second position includes a portion of the ULD protruding outside the compartment through the loading door opening,
III. rotating the ULD to a third position aligned with the cargo door opening, and
IV. driving the ULD outwardly through the cargo door opening.

According to a third aspect of the present invention there is provided an apparatus for facilitating loading a ULD into and unloading a ULD out of a cargo compartment of an aircraft through a loading door opening of the cargo compartment, the apparatus comprising:
a) means for loading the ULD into a first position, and for unloading the ULD from the first position, in the compartment through the cargo door opening,
b) means for rotating the ULD about a first pivot axis between the first position and a second position, wherein the second position includes a portion of the ULD protruding through the loading door outside the compartment, and
c) means for rotating the ULD about a second pivot axis between the second position and a third position wholly within the compartment.

In a preferred embodiment, the apparatus includes a set of PDUs comprising a plurality of lateral PDUs energiseable for driving the ULD through the loading door opening in a lateral direction across the cargo compartment, a plurality of longitudinal PDUs energiseable for driving the ULD in a longitudinal direction along the cargo compartment and at least one off-set PDU energiseable for providing a drive to the ULD at an angle between the lateral and longitudinal directions, wherein:
the means for loading and unloading the ULD comprises at least one of the lateral PDUs energiseable for driving the ULD across the cargo compartment and a first proximity sensor for providing a signal for defining the first position of the ULD,
the means for rotating the ULD about the first pivot axis comprises a first pivot means energiseable to support the ULD at the first pivot axis, at least two associated PDUs of the set of PDUs aligned with the first pivot means, and a second proximity sensor for providing a signal for defining the second position of the ULD, and
the means for rotating the ULD about the second pivot axis comprises a second pivot means energiseable to support the ULD at the second pivot axis, at least two associated PDUs of the set of PDUs aligned with the second pivot means, and a third proximity sensor for providing a signal for defining the third position of the ULD.

According to a fourth aspect of the present invention there is provided a control system for controlling loading a ULD into and unloading a ULD out of a cargo compartment of an aircraft through a loading door opening of the cargo compartment, the system comprising an operator input device and a controller configured to be operable for receiving instructions from the operator input device, and, in response to a load or an unload command from the operator input device, controlling operation of:
a) a loading means for loading the ULD into the compartment into, or unloading the ULD out of the compartment from, a first position,
b) a first rotating means for rotating the ULD between the first position and a second position wherein the second position includes a portion of the ULD protruding outside the compartment through the loading door, and
c) a second rotating means for rotating the ULD between the second position and a third position wholly within the compartment.

Embodiments of the invention have the advantage of an automated procedure for loading and turning ULDs so that the larger 96-inch ULDs can be loaded into a cargo compartment having a reduced width section. This means that the 96-inch ULDs can be loaded lengthways through a 98-inch cargo door opening and turned prior to stowing the ULD in the reduced width section.

BRIEF DESCRIPTION OF THE DRAWINGS

Embodiments of the invention will now be described with reference to the accompanying drawings in which.

PREFERRED MODES OF CARRYING OUT THE INVENTION

Figures 1A, 1B, 1C:
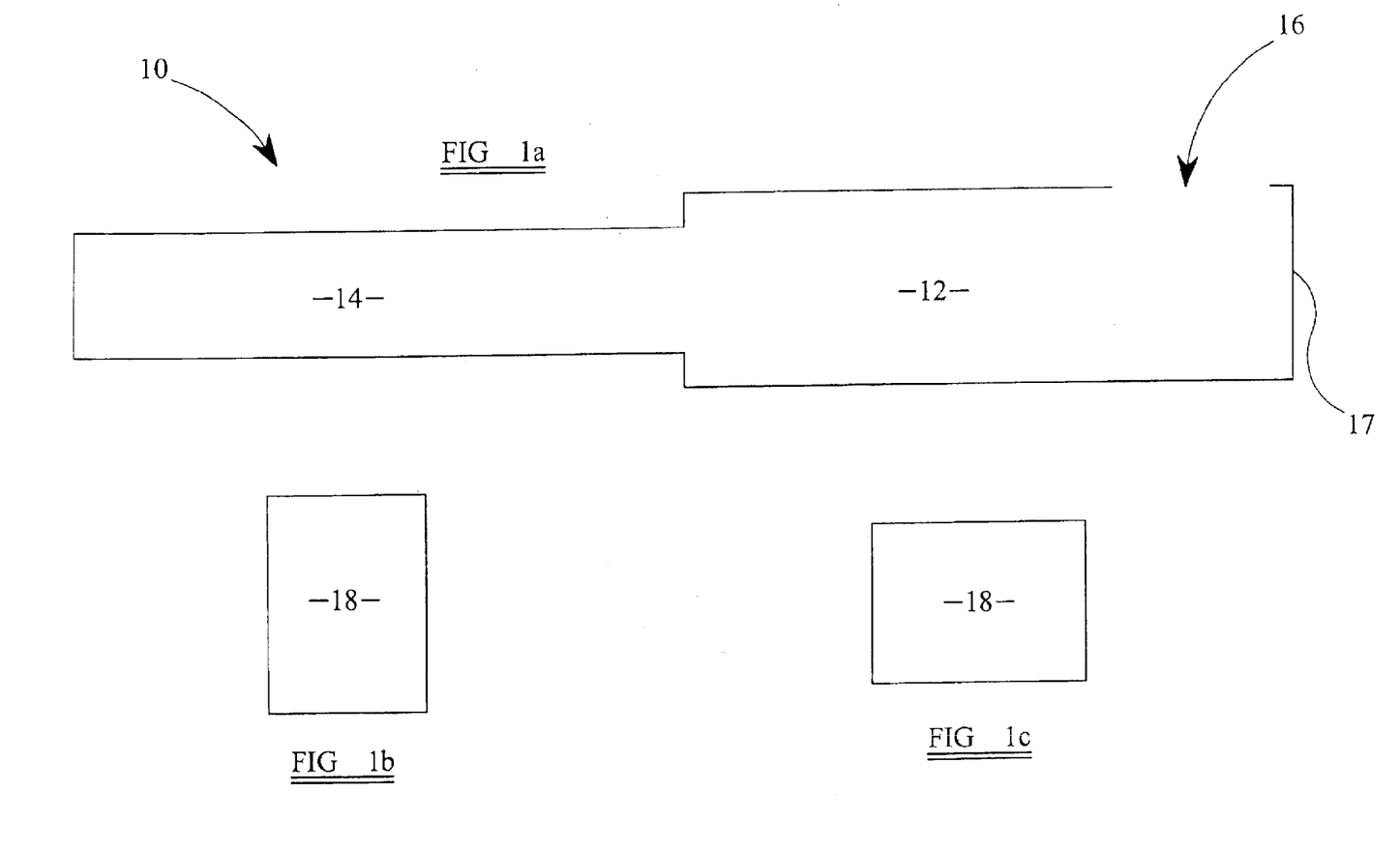
FIG. 1a is plan view showing the layout of a cargo compartment of an aircraft having a reduced width section.
FIGS. 1b and 1c show a footprint of a ULD in two orientations.

Referring to FIG. 1a, the floor area of a cargo compartment 10 of an aircraft is shown in plan view. The compartment 10 has a first area 12 and a second area 14. Second area 14 has a reduced width relative to first area 12. The compartment 10 has a loading door opening 16 situated in a side of the aircraft in the first area 12 close to an end 17 of the compartment 10. Cargo is loaded into the compartment 10 on pallets or in containers having set dimensions, and termed unit load devices (ULDs). The larger (96-inch) standard size of ULD is 3175 mm (125 inches) long and 2438 mm (96 inches) wide. The loading door opening 16 is typically about 50 mm (2 inches) wider than this.

FIG. 1b shows a footprint of a ULD 18 in a first, lateral orientation and FIG. 1c shows a footprint of the same ULD 18 in a longitudinal orientation. FIGS. 1b and 1c are substantially to the same scale as FIG. 1a, from which it can be seen that the ULD 18 will just fit through the loading door opening 16 in the lateral orientation of FIG. 1b, but will require turning through 90 degrees to the orientation of FIG. 1c in order to fit into the second, reduced width, area 14 of the compartment 10.

Figure 2:
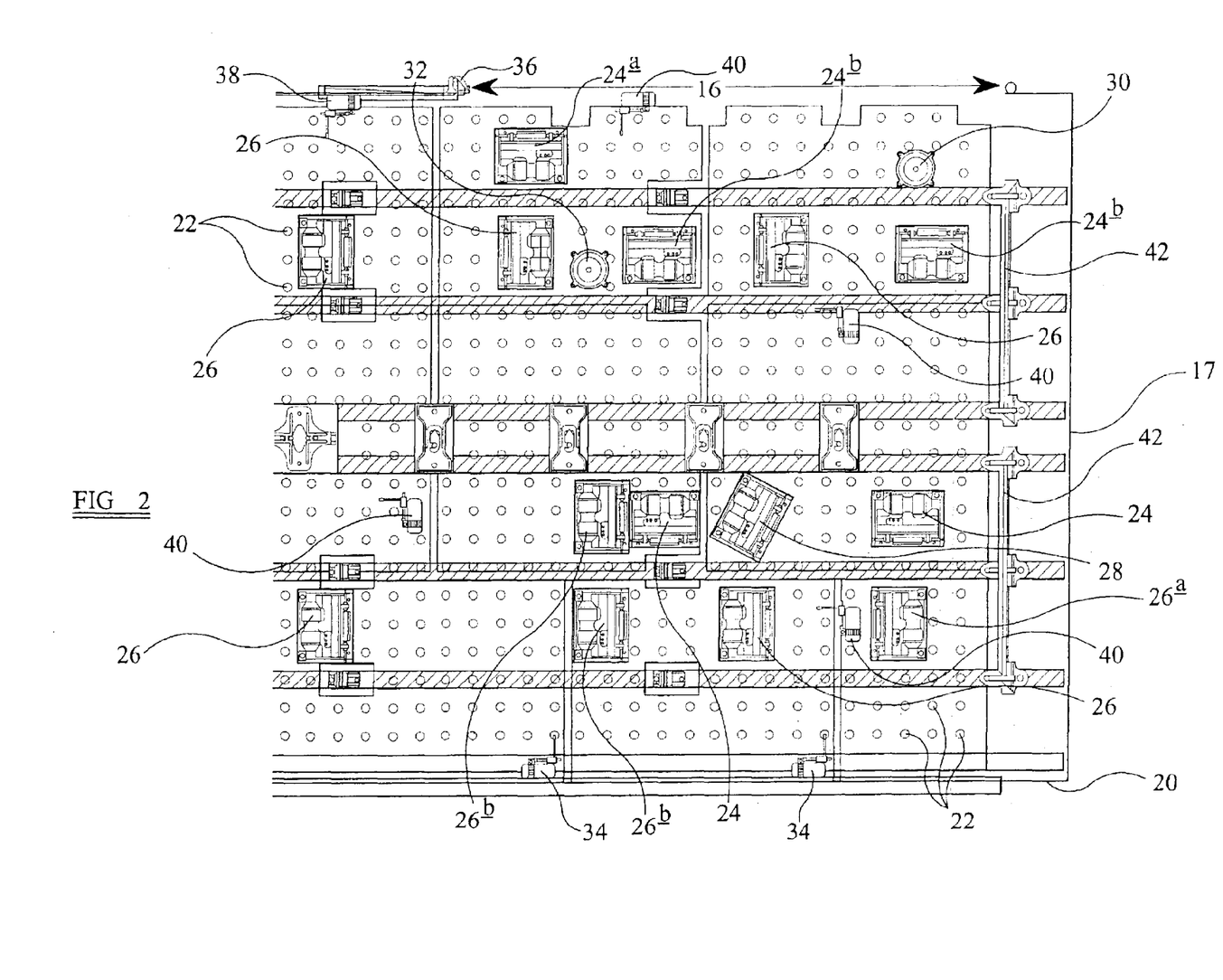
FIG. 2 is a plan view of a portion of the cargo compartment of FIG. 1, showing an arrangement of components for performing the method according to an embodiment of the invention.

Part of the floor area of the first area 12 in the vicinity of the loading door opening 16 is shown in plan view in FIG. 2. The extent of the floor area is shown by the outline 20. The floor area 20 is provided with various devices for facilitating movement of a ULD during loading and unloading operations. A plethora of freely rotating conveyance roller-balls 22 protrude through the floor to provide low friction support for the ULD. Power drive units (PDUs) 24, 24a, 24b, 26, 26a, 26b, 28 are energiseable to be elevated from beneath the floor to a level just above the conveyance rollers 22. Each PDU is a separate electro-mechanical actuator which includes one or more rubber coated wheels or drive rollers for contacting the underside of the ULD and providing a drive to move the ULD in a set direction, determined by the orientation of the PDU. The PDUs include lateral PDUs 24, 24a, 24b for driving a ULD in a lateral direction across the compartment 10 and through the loading door opening 16, longitudinal PDUs 26, 26a, 26b for driving a ULD in a longitudinal direction along the compartment 10, and an off-set PDU 28 for driving a ULD at an angle between the lateral and longitudinal directions.

A first pivot 30 and a second pivot 32 are independently energiseable to be elevated from beneath the floor to a level just above the conveyance rollers 22 so as to contact the underside of the ULD. The first and second pivots 30, 32 define first and second pivot axes respectively in the floor area 20. When energised, the first pivot 30 or the second pivot 32 is elevated to support the ULD at the respective pivot axis while allowing the ULD to be rotated about the pivot axis of the respective pivot.

The first pivot 30 has associated PDUs 24a, 26a, 28, each of which is aligned so that the axis of rotation of the PDU drive wheels lies on a line which intersects the first pivot axis. When the first pivot 30 is energised to support a ULD the associated PDUs 24a, 26a, 28 are also energiseable to provide a drive so as to rotate the ULD about the axis of the first pivot.

The second pivot 32 has associated PDUs 24b, 26b each of which is aligned so that the axis of rotation of the PDU drive wheels intersects the second pivot axis. When the second pivot 32 is energised to support a ULD the associated PDUs 24b, 26b are energiseable to provide a drive so as to rotate the ULD about the second pivot axis.

Proximity sensors 34, 36, 38, 40 are provided in and around the floor area 20 for sensing proximity of a ULD. Proximity sensors 34, 36, 38, 40 may either be comprised in hard stops for preventing further movement of a ULD beyond a certain position, or may be control sensors for sensing whether a ULD is present at a certain location.

The compartment 10 in floor area 20 is also provided with guide rails 42 for ensuring lateral movement of a ULD during loading or unloading without any sliding or drifting towards the end wall 17 of the compartment 10. An actuator (not shown) can be energised to lower the guide rails 42 below the floor when required.

Figure 3:
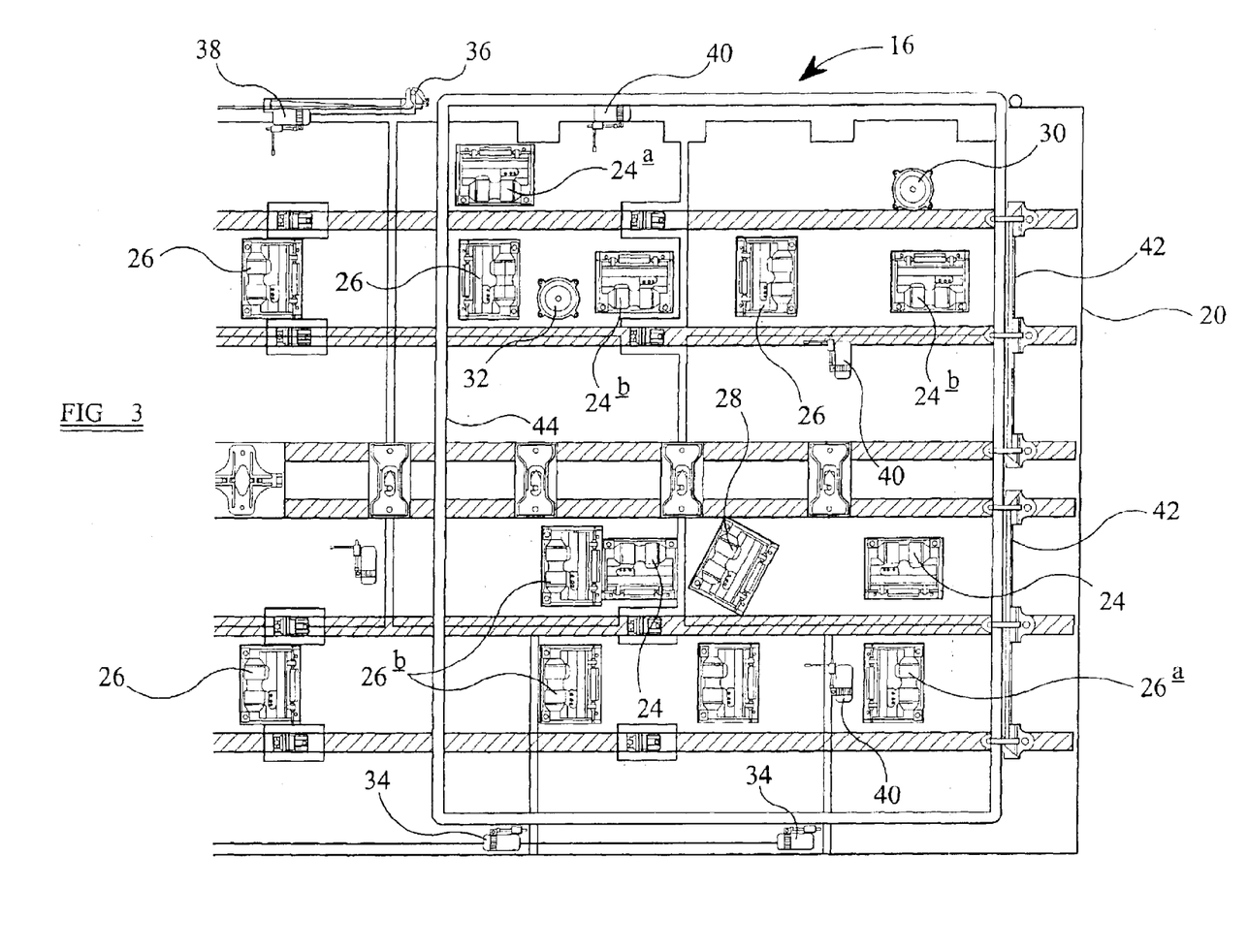
FIG. 3 is the plan view of FIG. 2, showing a ULD in a first position according to an embodiment of the invention.

Referring to FIG. 3, in which identical reference numerals refer to identical features of FIG. 2, the first stage in a loading and turning operation of a 96-inch ULD includes energising lateral PDUs 24, 24a, 24b. The ULD is driven into the compartment 10 through the loading door opening 16. Movement ceases when the ULD reaches a first proximity sensor 34, comprised in a hard stop, which indicates that the ULD has reached the full extent of lateral travel. The drive provided by lateral PDUs 24, 24a, 24b is removed. The ULD occupies a first position shown in FIG. 3 by footprint 44.

Figure 4:
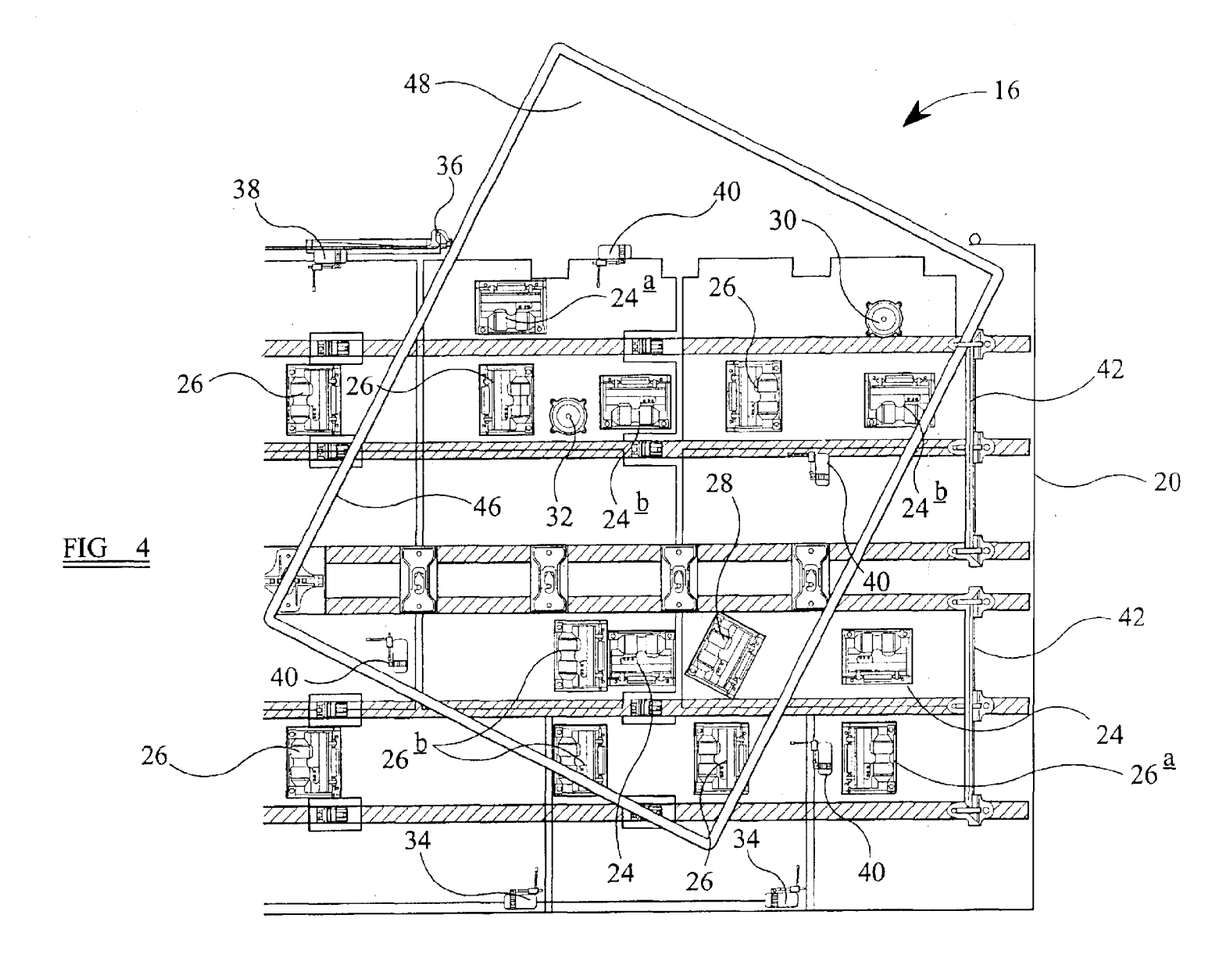
FIG. 4 is the plan view of FIG. 2, showing a ULD in a second position according to an embodiment of the invention.

The second stage commences by energising the first pivot 30 and the PDUs associated therewith 24a, 26a, 28. The ULD is rotated about the pivot axis of first pivot 30 (in a clockwise direction according to FIG. 3). Referring to FIG. 4, when a second proximity sensor 36 senses that rotation of the ULD has reached a limit defined by an edge of the loading door opening 16, the drive provided by the PDUs 24a, 26a 28 associated with the first pivot is removed and further rotation ceases. The ULD occupies a second position shown in FIG. 4 by footprint 46. In the second position, a portion 48 of the ULD extends through the loading door opening 16. The first pivot 30 is de-energised.

Figure 5:
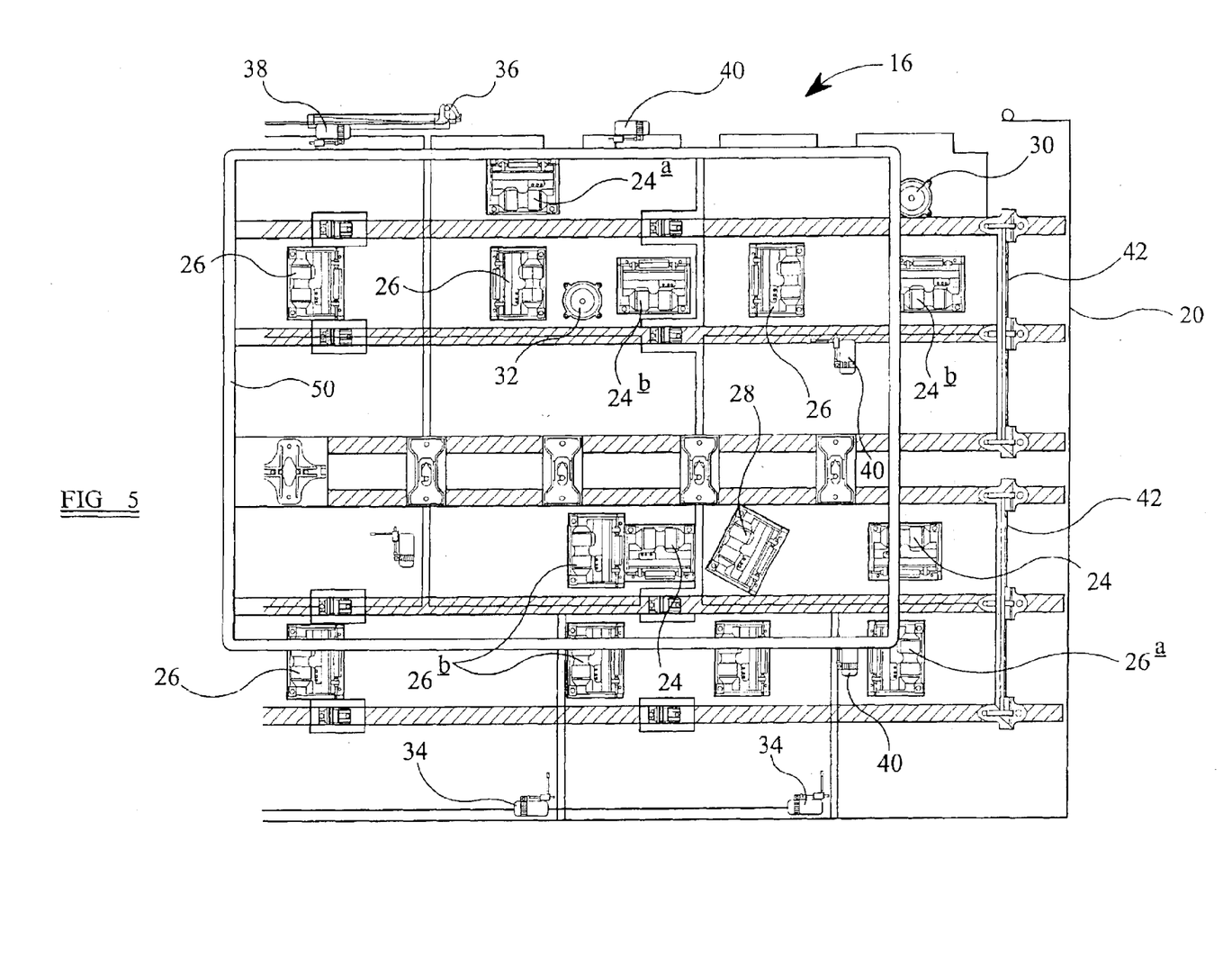
FIG. 5 is the plan view of FIG. 2, showing a ULD in a third position according to an embodiment of the invention.

The third stage commences with lowering of the guide rails 42 to provide additional space within the floor area 20 for allowing further rotation of the ULD. The second pivot 32 and the PDUs associated therewith 24b, 26b are energised. The ULD is rotated about the pivot axis of second pivot 32 (in a clockwise direction according to FIG. 4). Referring to FIG. 5, rotation ceases when a third proximity sensor 38, comprised in a hard stop, senses that rotation of the ULD has reached a limit defined by a wall adjacent the loading door opening 16. The drive provided by the PDUs 24b, 26b associated with the second pivot is removed. The ULD occupies a third position in which it has undergone a 90-degree rotation, as shown in FIG. 5 by the footprint 50. The second pivot 32 is de-energised and the guide rails 42 raised.

After rotation of the ULD further operations can be performed to drive the ULD to its final position in the second, reduced width area 14 of the compartment 10 shown in FIG. 1a. Longitudinal PDUs 26, 26a are energised to drive the ULD towards the guide rails 42. Longitudinal PDUs 26, 26a are then de-energised and lateral PDUs 24, 24a are energised to drive the ULD to a lateral position aligned with the second area 14 of the compartment 10. The ULD is then driven into its final position in the second area 14.

Unloading of a ULD from the second area 14 of the compartment 10 of FIG. 1*a* is essentially a reverse of the procedure described above for loading. The ULD is first driven to the third position 50 shown in FIG. 5, using the longitudinal PDUs 26, 26*a* and the lateral PDUs 24, 24*a*, and defined by the proximity sensors/hard stops 38, 40. Thereafter, the ULD is rotated by means of the pivot 32 and associated PDUs 24*b*, 26*b* to the second position shown in FIG. 4. The ULD is then rotated to the first position, shown in FIG. 3, by means of the first pivot 30 and associated PDUs 24*a*, 26*a* and 28. Finally, the ULD is driven out of the loading door opening by means of the lateral PDUs 24, 24*a*.

The procedures described above for loading and unloading of a ULD can be automated. A controller, activated by an operator input device, for example a joystick, controls the energising and de-energising of the PDUs 24, 24*a*, 24*b*, 26, 26*a*, 26*b*, 28, pivots 30, 32 and guide rails 42. Signals from the proximity sensors 34, 36, 38, 40 are provided to the controller for indicating the positions reached by the ULD. Thus, the operator pushes the joystick to commence the procedure once the ULD is in position for loading through the loading door opening 16, the controller takes over control of all the operations in sequence (only interruptible by the operator via the joystick).

Figure 6:
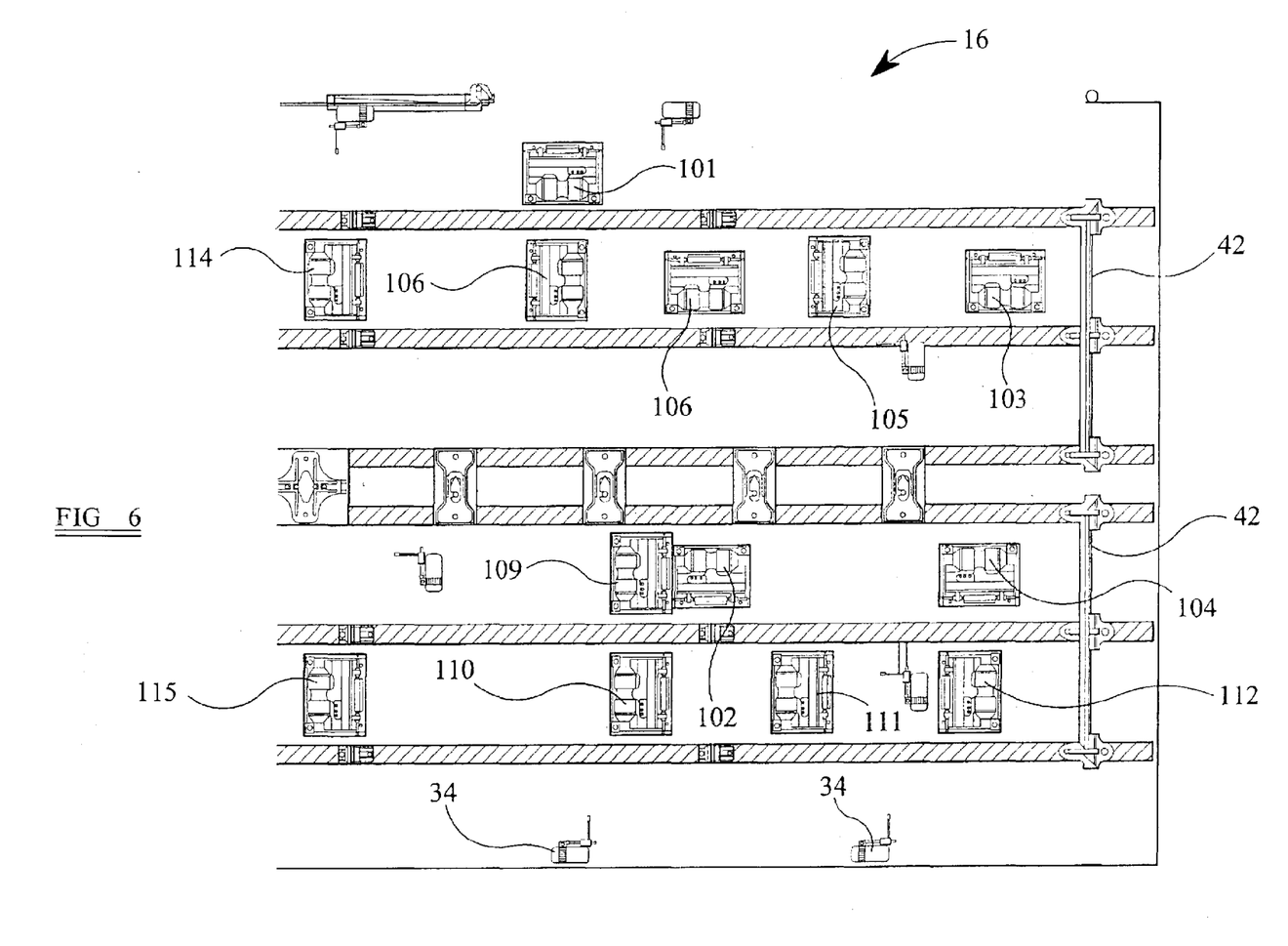
FIG. 6 is a plan view similar to that of FIG. 2 showing an arrangement of components for performing a method according to an alternative embodiment.

An alternative method of loading and turning a ULD, suitable for use as a backup method in case of failure of a pivot, will be described with reference to FIG. 6, in which equivalent features have the same numerals as in FIGS. 2 to 5. In FIG. 6, floor area 20 has a similar arrangement of PDUs to that shown in FIG. 2, but without pivots 30, 32 and without the off-set PDU 28. In FIG. 6 the lateral PDUs have numerals 101 to 105 and the longitudinal PDUs have numerals 106, 107 and 109 to 115.

The ULD is driven into the first position (as shown in FIG. 3) by energising the lateral PDUs 101 to 105. The lateral PDUs 101 to 105 then disengage and longitudinal PDUs 110, 111 and 112 engage in a direction away from the guide rails 42. As PDUs 110, 111 and 112 are situated close to one end of the ULD, this will cause the ULD to rotate. After a predetermined time (about 5 seconds) the lateral guides 42 are lowered, and after a further predetermined time lateral PDU 103 is energised to drive the ULD away from the cargo door opening 16. Longitudinal PDUs 110, 111 and 112 and lateral PDU 103 continue driving the ULD until the rotation is complete and are then disengaged. The lateral PDUs 101 to 105 are then energised to drive the ULD against the lateral guides to ensure that the ULD is correctly aligned for driving towards the second area 14 of the compartment 10 shown in FIG. 1*a*.

What is claimed is:

1. A method of loading a ULD into a cargo compartment of an aircraft through a loading door opening of the cargo compartment, which method requires turning of the ULD and comprises the steps of:
    loading the ULD into the compartment to a first position,
    rotating the ULD about a first pivot axis positioned at a predetermined location in the cargo compartment to a second position wherein in the second position a portion of the ULD protrudes outside the compartment through the loading door opening, and
    rotating the ULD about a second pivot axis positioned at a second predetermined location in the cargo compartment spaced from said first pivot axis to a third position wholly within the compartment.

2. A method of loading a ULD as claimed in claim 1 wherein said first and second pivot axes are defined by respective first and second pivot means, the first and second pivot means each being operative for supporting the ULD at the respective pivot axis.

3. A method of loading a ULD as claimed in claim 2 wherein the compartment is provided with a set of PDUs comprising a plurality of lateral PDUs energizable for driving the ULD through the loading door in a lateral direction across the cargo compartment, a plurality of longitudinal PDUs energizable for driving the ULD in a longitudinal direction along the cargo compartment and at least one off-set PDU energizable for providing a drive to the ULD at an angle between the lateral and longitudinal directions; wherein the step of loading comprises energizing at least one of the lateral PDUs to drive the ULD into the loading bay to the first position.

4. A method of loading a ULD as claimed in claim 3 wherein the first pivot means is energizable to support the ULD at the first pivot axis, the first pivot means having at least two associated PDUs of the set of PDUs aligned therewith, the step of rotating the ULD to the second position comprising energizing the first pivot means and PDUs associated therewith.

5. A method of loading a ULD as claimed in claim 3 wherein the second pivot means is energizable to support the ULD at the second pivot axis, the second pivot means having at least two associated PDUs of the set of PDUs aligned therewith, the step of rotating the ULD to the third position comprising energizing of the second pivot and PDUs associated therewith.

6. A method of loading a ULD as claimed in claim 3 wherein the step of loading the ULD into the compartment comprises: inserting an end of the ULD through the loading door opening, energizing at least one of the lateral PDUs to drive the ULD into the compartment to the first position defined by a signal from a first proximity sensor for sensing proximity of the ULD.

7. A method of loading a ULD as claimed in claim 6 wherein the first proximity sensor is situated adjacent a wall of the compartment opposite the loading door.

8. A method of loading a ULD as claimed in claim 6 wherein the steps of rotating the ULD comprise the following procedure:
    energizing the first pivot means and PDUs associated therewith to rotate the ULD to the second position defined by a signal from a second proximity sensor, and
    energizing the second pivot means and PDUs associated therewith to rotate the ULD to the third position defined by a signal from a third proximity sensor.

9. A method of loading a ULD as claimed in claim 8 wherein the second proximity sensor is situated adjacent an edge of the loading door opening.

10. A method of loading a ULD as claimed in claim 8 wherein the third proximity sensor is situated adjacent a wall of the compartment alongside the loading door opening.

11. A method of loading a ULD as claimed in claim 3 including an additional final step of energizing at least one of the longitudinal PDUs to drive the ULD into a final position in the cargo compartment.

12. A method of loading a ULD as claimed in claim 11 including, prior to the final step, the additional steps of:
    energizing the longitudinal PDUs to drive the ULD towards a fourth position defined by a signal from a fourth proximity sensor, the fourth position being situated adjacent the loading door so that the ULD is driveable by the lateral PDUs, and
    energizing the lateral PDUs to drive the ULD to a fifth position.

13. A method of loading a ULD as claimed in claim 12 wherein the fifth position is aligned with a reduced width portion of the cargo compartment so that the final position of the ULD is situated within the reduced width portion of the cargo compartment.

14. A method of loading a ULD as claimed in claim 1 wherein the cargo compartment is further provided with a retractable guide rail for guiding movement of the ULD, the guide rail being disposed laterally across the compartment and having an alignment with an edge of the loading door opening, wherein prior to the steps of rotating the ULD the guide rail is retracted, thereby enabling a portion of the ULD to extend past the guide rail alignment during the rotating steps.

15. A method of loading a ULD as claimed in claim 1 wherein step II comprises energizing a first set of PDUs for a first predetermined time, step III comprises energizing a second set of PDUs for a second predetermined time, and a further step comprises energizing a set of lateral PDUs to drive the ULD against a set of guide rails.

16. A method of unloading a ULD from a cargo compartment of an aircraft through a loading door opening of the cargo compartment, which method requires turning of the ULD and comprises the steps of:

positioning the ULD in a first predetermined position in the cargo compartment, rotating the ULD about a first pivot axis positioned at a first location in the cargo compartment to a second position wherein the second position includes a portion of the ULD protruding outside the compartment through the loading door opening, rotating the ULD about a second pivot axis positioned at a second location in the cargo compartment spaced from said first pivot axis to a third position aligned with the cargo door opening, and driving the ULD outwardly through the cargo door opening.

17. An apparatus for facilitating loading a ULD into and unloading a ULD out of a cargo compartment of an aircraft through a loading door opening of the cargo compartment, the apparatus comprising:

means for loading the ULD into a first position, and for unloading the ULD from the first position, in the compartment through the cargo door opening, means for rotating the ULD about a first pivot axis positioned at the first location in the cargo compartment between the first position and a second position, wherein the second position includes a portion of the ULD protruding through the loading door outside the compartment, and means for rotating the ULD about a second pivot axis positioned at a second location in the cargo compartment spaced from said first pivot axis between the second position and a third position wholly within the compartment.

18. An apparatus for facilitating loading a ULD as claimed in claim 17 including a set of PDUs comprising a plurality of lateral PDUs energizeable for driving the ULD through the loading door opening in a lateral direction across the cargo compartment, a plurality of longitudinal PDUs energizeable for driving the ULD in a longitudinal direction along the cargo compartment and at least one off-set PDU energizeable for providing a drive to the ULD at an angle between the lateral and longitudinal directions, wherein:

the means for loading and unloading the ULD comprises at least one of the lateral PDUs energizeable for driving the ULD across the cargo compartment and a first proximity sensor for providing a signal for defining the first position of the ULD, the means for rotating the ULD about the first pivot axis comprises a first pivot means energizeable to support the ULD at the first pivot axis, at least two associated PDUs of the set of PDUs aligned with the first pivot axis, and a second proximity sensor for providing a signal for defining the second position of the ULD, and the means for rotating the ULD about the second pivot axis comprises a second pivot means energizeable to support the ULD at the second pivot axis, at least two associated PDUs of the et of PDUs aligned with the second pivot axis, and a third proximity sensor for providing a signal for defining the third position of the ULD.

19. A control system for controlling loading a ULD into and unloading a ULD out of a cargo compartment of an aircraft through a loading door opening of the cargo compartment, the system comprising an operator input device and a controller configured to be operable for receiving instructions from the operator input device, and, in response to a load or an unload command from the operator input device, controlling operation of:

a loading means for loading the ULD into the compartment into, or unloading the ULD out of the compartment from, a first position, a first rotating means for rotating the ULD about a first pivot axis positioned at a first location in the cargo compartment between the first position and a second position wherein the second position includes a portion of the ULD protruding outside the compartment through the loading door, and a second rotating means for rotating the ULD about a second pivot axis positioned at a second location in the cargo compartment spaced from said first pivot axis between the second position and a third position wholly within the compartment.

* * * * *